W. H. McCAFFREY.
PNEUMATIC WHEEL.
APPLICATION FILED SEPT. 15, 1915.
1,249,438.
Patented Dec. 11, 1917.
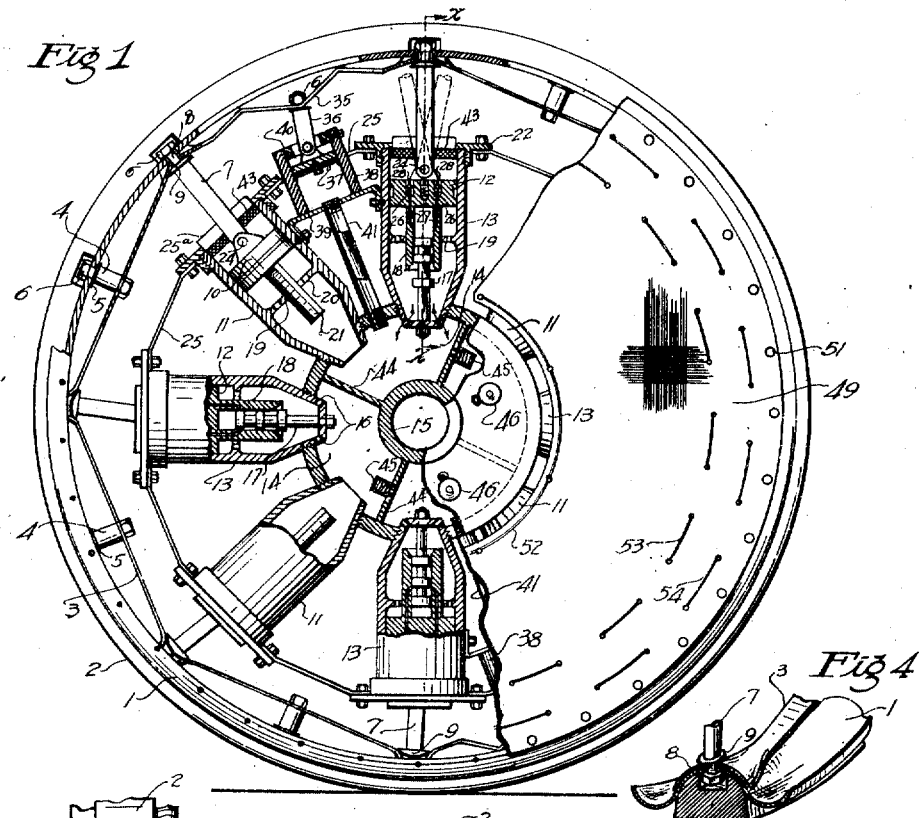
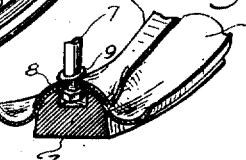
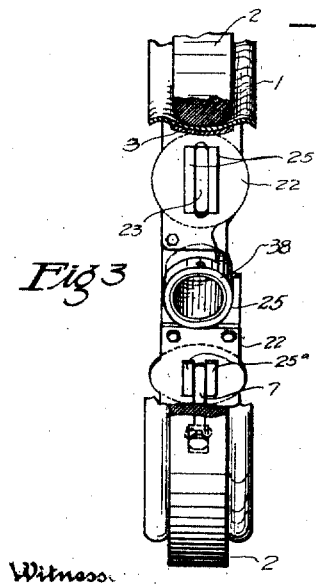
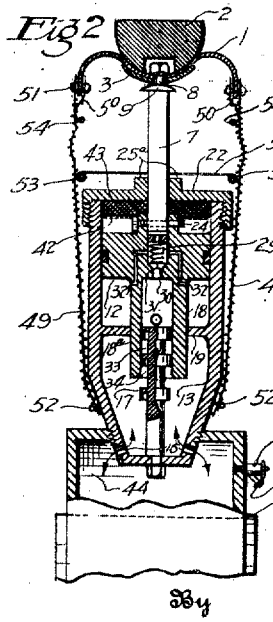
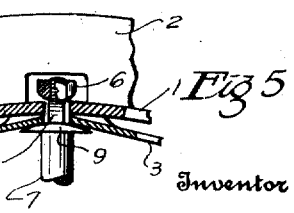
Inventor
Wm. H. McCAFFREY

UNITED STATES PATENT OFFICE.

WILLIAM HENRY McCAFFREY, OF BIRMINGHAM, ALABAMA, ASSIGNOR OF ONE-HALF TO R. D. JOHNSTON, JR., OF BIRMINGHAM, ALABAMA.

PNEUMATIC WHEEL.

1,249,438.   Specification of Letters Patent.   Patented Dec. 11, 1917.

Application filed September 15, 1915. Serial No. 50,791.

*To all whom it may concern:*

Be it known that I, WILLIAM H. McCAFFREY, a citizen of the United States of America, residing at Birmingham, in the county of Jefferson and State of Alabama, have invented certain new and useful Improvements in Pneumatic Wheels, of which the following is a specification.

My invention relates to a novel type of wheel in which the rim is buoyantly supported on compressed air which is maintained automatically at the required pressure for sustaining the load by the operation of the wheel. It is my purpose to design a wheel to give as nearly as possible the effect of a pneumatic tire while using a metal rim which may be provided with a solid rubber tread if desired. In designing a wheel of this type it is vitally essential that there shall be a practical and strong connection between the hub and the rim which will transmit the traction pull equally in either direction to the rim and will at the same time brace it effectively against lateral thrust without interfering with its buoyant support of the load.

One feature of my invention consists in providing a novel type of rim which is preferably corrugated circumferentially to give it maximum strength for weight and which, with the same object in view, is braced by a continuous inner polygonal rim connected thereto at points so as to form braces or struts. The object of this arrangement is to provide an outer rim which, though light, has substantial inherent resistance to deformation under the load or shocks. This arrangement limits to the smallest degree the relative movement for which provision must be made between the rim and its supporting means and contemplates a compensating movement in the inner rim which is yieldingly resisted, preferably by dashpot pistons which ride on the air that supports the rims and are shorter than the wheel spokes so that they are adapted to apply the initial torque or traction pull from hub to rim, and vice versa.

A further feature of my invention is directed to the provision of effective supporting means for the rim. In this connection I have conceived that the outer double rim should be supported for limited circumferential movement by short spokes which are pivotally connected to piston plungers which travel in cylinders rigid with the hub. The spokes are radially disposed and capable of a limited circumferential play in the plane of the several spokes but are braced against lateral play by the guides at the ends of the cylinders. This arrangement is based on the conception that the traction strain should be equally available for either direction of movement and should be equally distributed about the rim while the lateral thrust on the rim is taken up at points on the spokes adjacent to the rim. The joint between the spoke and the rim is preferably one which provides with a minimum of friction and strain for the change in position of the spoke responsive to a change in direction of the traction pull or to the limited eccentric movements of the rim under load or shocks.

A further important feature of my invention relates to the means for buoyantly supporting the piston plungers to which the rim spokes are connected. In considering this phase of my invention, it is necessary, having in view the economical production of the wheel, to reduce to a minimum the number of plunger pistons while at the same time adapting them or part of them to perform the additional function of maintaining the air pressure upon which the plungers buoyantly ride. To this end I have designed all of the piston plungers to serve as buoyant supports for the rim and have adapted one or more of them to perform the additional function of maintaining, by a pumping action, the air pressure at the hub reservoir which buoyantly supports the plunger.

One vitally important feature of my invention relates to the design of the storage chambers for the compressed air and these are preferably obtained by providing a hub reservoir which subdivided into distinct compartments, each of which receives the supporting body of air for a group of the plungers so that the subdivision or compartment will act as an independent unit in sustaining its proportionate share of the load. Preferably I provide one pumping plunger in the group of plungers for each reservoir compartment, though it is within the contemplation of my invention that two or more of the compartments may be interconnected and provided with check valves so that each pumping plunger may maintain the pressure in two or more of the compartments and thus simplify the wheel and reduce its cost.

My invention also comprises the various other details of construction and arrangement of parts which are hereinafter more particularly described and claimed, and which are illustrated in their preferred embodiment only in the accompanying drawings which form a part of this specification, and in which:—

Figure 1 is a side elevation of the wheel with its canvas casing broken away and a number of its cylinders and its hub shown partly in section.

Fig. 2 is a sectional view on the line $x$—$x$ of Fig. 1.

Fig. 3 is a partial plan view of Fig. 1 with the rim broken away to show the cylinder ends in plan view.

Fig. 4 is a detail cross sectional view through one of the plunger spoke joints to the rim.

Fig. 5 is a longitudinal sectional view through the joint shown in Fig. 4.

Fig. 6 is a detail view of the combined relief valve and valve for the charging of air and oil into the air reservoirs of the hub.

Similar reference numerals refer to similar parts throughout the drawings.

As illustrated, my wheel comprises an outer rim 1 which is corrugated as shown in cross section Fig. 2 so as to adapt it to receive a solid rubber tread 2 and to give it the maximum strength for weight. Within this outer rim is mounted a continuous rim 3 which is made polygonal so that its sides, being disposed like chords, form a continuous series of braces or struts which engage and increase the rigidity of the outer rim and brace it against a tendency to become substantially deformed under pressure of the load or shocks, my idea being that the two rims 1 and 3 should be adapted to support the weight on the wheels by a bodily eccentric movement which would shift their center relatively to the center of the hub rather than by the local indentation or yielding of a flexible rim. The sides of the rim 3 are connected to the outer rim by a series of shouldered bolts 4 having their inner shoulders flattened to engage the outer face of the rim 3 and having their outer shoulders 5 slightly curved circumferentially to engage the inner face of the rim 1. The inner ends of the bolts 4 are threaded and connected by nuts to the rim 3 and nuts 6, having their inner face rounded, connect the outer ends of the bolts to the rim 1, but it will be noted that this outer end of the bolt is square and works in an elongated rectangular slot which permits only a limited circumferential movement between the two rims. Midway between these bolts 4 the two rims engage and are connected together by the outer ends of the spokes 7. These spokes are reduced to form square outer ends 8 which pass through and fit snugly between the side walls of slightly elongated rectangular alining slots in both rims 1 and 3. The ends 8 are turned and threaded to receive each a nut 6 having its inner bearing face curved and shaped also to fit against the grooved center of the outer rim. If desired, the shoulder 9 at the outer end of the spoke can be widened and slightly rounded where it bears against the rim 3. The square fit of the spoke ends in the slots in the rim is such as to prevent turning while permitting a limited circumferential play of the rim, which in practice is about an eighth of an inch for the average wheels. Alternate spokes are connected to pistons 10 working in cylinders 11 and the other alternate spokes are connected to pistons 12 which work in cylinders 13. These several cylinders have their inner ends tapered and, when cast separate from the hub, their taper ends are threaded and screwed with a tight, rigid fit into threaded taper sockets in the rim of a reservoir 14 through the axial center of which reservoir passes a tubular integral sleeve 15 which forms the wheel bearing and is adapted to receive any desired type of antifriction bearings. The cylinders 11 are open at their inner ends to the reservoir while the several cylinders 13 have their inner ends closed but are in communication with the reservoir through ports 16. The inner end is left in each cylinder 13 for the purpose of receiving and supporting a pump piston 17 which is bolted thereto and has its outer end working in a pump barrel 18 movable with a piston 12. The barrel 18 is turned externally and provided with a flat face 18ª so that it will make a sliding but non-turning fit in a correspondingly shaped opening in a spider 19 which guides it and its piston 12 and the cylinders 11 are provided each with a spider 20 which receives a flattened guide stem 21 for a piston 10. All of the pistons are provided with suitable packing rings to prevent leakage as they are all exposed internally to reservoir pressure. On the outer end of each cylinder I screw a cap 22 having therein an elongated narrow slot 23 having rounded ends and made slightly wider than the spoke 7 which passes therethrough and which is pivotally connected by a case hardened square headed pin 24 to lugs on the pistons 10 or 12, the pin being held by its square head against turning and wearing the lugs on the piston. These several caps 22 are braced and connected together by angle bars 25 which are bolted to the side flanges of the cap and each cap has along each side of the spoke slot raised lugs 25ª to increase the side or lateral thrust bearings for the spoke.

Each piston 12 is bored radially of the wheel to form three valve chambers, the two outer chambers 26 being duplicate air intake chambers which communicate through reduced passages 27 in the pump barrel with the interior thereof. The outer ends of the intake chambers 26 are closed by inwardly opening spring pressed check valves 28 which seat against removable end plugs. The central chamber 29 opens through a port 30 into the outer end of the pump chamber and it is provided with an internal spring pressed outwardly opening check valve 31 which seats over the port 30. From this chamber 29 an outlet passage 32 leads through the pump barrel and opening into the cylinder 13. The pump piston 17 is circumferentially grooved to form a series of spaced annular ports 33 and 34 which are arranged to function in the manner hereinafter described.

At two or more points about the wheel, preferably at diametrically opposite points, I omit the shouldered bolts 4 from the inner rim 3 and I give its side at that point a double bend so that its central inwardly convex portion 35 has an elongated slot through which I pass the reduced squared end of a short spoke 36 and connect it thereto by a nut 6. This short spoke is pivotally connected to a dashpot plunger 37 which works in a cylinder 38 mounted on a bracket 39 bolted to the sides of an adjacent pair of cylinders 11 and 13. A stop ring 40 is screwed in the outer end of the cylinder to limit the outward play of the plunger and a small pipe 41 leads from the inner end of the dashpot cylinder into the hub reservoir, being screwed into the reservoir. This cylinder is braced near its outer end by being embraced by an angle plate 25, which is slotted to receive the dashpot and connects the caps of the adjacent pair of cylinders. A light wire screen 42 is inserted in the outer end of each cylinder 11 and 13 and a packing 43 is inserted between this screen and the cap 22 so as to prevent the access of dirt to the cylinders. The screen prevents the packing from working into and therefore clogging the air admission to the supply ports 27. It will be noted that the inner rim 3 opposite the dashpot is not connected to the outer rim but it has several bearing points due to the reverse bends provided in it.

The air reservoir in the hub formed between the inner and outer peripheral wall thereof is subdivided by a plurality of radial partitions 44 so as to form separate and distinct compartments of air chambers. As shown each of these chambers is in communication with a pumping cylinder 13 and a cylinder 11. I have also shown two of these diaphragms provided with ports closed by spring pressed check valves 45, the valves being so arranged that the pumps in the diametrically opposite compartments into which the valves open can be dispensed with as the other two pumps will maintain the pressure in the two compartments with which they communicate through the check valves. This arrangement of the check valves is flexible and permits the number of pumps to be reduced to a minimum while at the same time preventing the passage of air from one compartment to another except to increase the pressure in the latter.

I provide each of the compartments with a compound valve casing 46, the casing having a safety blow off valve 47 for the relief of excess pressure and having an internally opening check valve closing a port 48 through which an initial charge of air and oil can be introduced.

In operation, as the pump barrels reciprocate about the pistons 17, air pressure is drawn past the check valves 28 through passages 27 and is compressed in the inner ends of the pump chambers until its pressure is sufficient to open the check valves 31, when it flows through the passages 32 into the cylinders 13 and into the reservoir in which the pressure is therefore automatically maintained by the action of the wheel. When the reservoir pressure is normal, the wheel is buoyantly supported by the several pistons 10 and 12 and also by the dashpot plungers 37. In the event the reservoir pressure is lost in any or all compartments thereof, the weight on the wheel is taken by the caps 22 of the upper cylinders, by the side spokes bearing against the upper ends of the slots 23 of their cylinders, and by the cap plate nuts of the bottom cylinder which, due to the resulting slight deformation of the wheel, would engage the rim 3. If no pump is available to initially charge the air reservoir compartments, the reservoir pressure can be built up by causing the car to partly rotate the wheel back and forth, each such movement serving to obtain a pump operation that gradually builds up the pressure in a compartment without unduly straining the rim supports. When the air pressure is established in the several compartments, its outward pressure is established in the several cylinders and resists the tendency of the hub, which carries the weight, to substantial eccentric movement relative to the rim center. The play of the pump barrels over ordinary roadways and with normal reservoir pressure is such as to avoid pumping action but under abnormal conditions where the reservoir pressure falls or there are jars and considerable jolts, the pump barrels will move sufficiently to compress the air therein and overcome the reservoir pressure on the outer sides of the check valves 31 to open them and force air into the reservoir and when the air pressure therein builds up abnormally it is relieved to the normal pressure by the safety valve 47. The important function of the dashpots is to yieldingly resist the necessary tendency of the free sides of the inner rim to buckle inwardly when the outer rim becomes deformed or when traction pull is applied which is done primarily through the dashpot spokes 36 in conjunction with the main spokes 7. The circumferential play allowed where the spokes pass through the rims permit this limited relative movement of the inner rim in either direction. The traction is equally effective in either direction; there is a minimum vibration of the buoyantly supported pistons under normal operating conditions, in fact no more than the yielding of a tire under its load; there are no rigid joints which will not provide for the necessary play under extreme conditions of operation; and under all normal operating conditions the load is wholly supported freely and buoyantly on a body of compressed air.

When the wheel is in service a substantial quantity of oil is introduced into the reservoir through the charging valve ports 48 and this oil is free to flow into the several cylinders 11 and 13 and also into the several dashpot cylinders so as to effectively lubricate all internal moving bearings in the wheel.

If desired the wheel may be provided with flexible canvas or fabric protecting strips 49 on each side. These strips are annular and are provided at their outer peripheries with a flap 50 and the inturn edge of the rim 1 is received in the pocket between the cover and the flap and connected thereto by bolts 51. At its inner periphery the covers are provided with holes through which draw strings or wires 52 are passed and woven back and forth between the inner taper ends of the cylinders to draw the cover securely about them. Wires 53 and 54 are woven in circles through the covers and stiffen the latter and leave a fold between them where the cover is intended to flex with the bodily eccentric movements of the rim. In order to hold the covers tight about the cylinders and against flapping, the wires 53 are connected by cross strands 55 which pass over the tops of the cylinders.

What I claim as new and desire to secure by Letters Patent, is:—

1. In a wheel of the character described, a central divided compressed-air holder, radial cylinders projecting therefrom and communicating therewith, pistons movable in the cylinders, spokes hinged to the pistons and adapted to swing in the plane of the spokes, lateral guides for the spokes rigid with the hub, a bodily movable rim, and a yielding connection between the rim and its said supporting spokes.

2. In a wheel of the character described, a corrugated outer rim, a continuous inner rim connected to the outer rim to brace it, the connections between the rims permitting a limited relative circumferential movement, spokes connected to the rims, pistons hinged to the spokes, and means to buoyantly support the pistons under outward pressure.

3. In a wheel of the character described, a rim formed by an outer circular band and an inner polygonal band, means to connect the bands to form a light, rigid, braced rim, spokes connected to the two bands at their points of contact, means to buoyantly support the spokes and force them radially outwardly from the hub, and buoyant means to resist a buckling tendency of the inner band.

4. In a wheel of the character described, an outer rim formed by a continuous circumferentially corrugated strip of metal, rectangular circumferentially elongated slots in the centrally depressed portion of the rim, spokes which support the rim and have squared ends which project through and fit snugly against the sides of said slots but have limited play endwise of the slots, pistons to which the spokes are hinged, and hub means to buoyantly support the pistons and force them outwardly radially therefrom.

5. In a wheel of the character described, a continuous circumferentially corrugated outer rim, a continuous polygonal inner rim connected at its corners and braced between its corners to the outer rim to form strut braces therefor, said connections being adapted to permit a limited circumferential movement between the two rims, spokes connected to the rims by being passed through the circumferential slots therein in which the spokes have a limited circumferential play, pistons hinged to the spokes, cylinders which receive the pistons, a hub on which the cylinders are radially mounted and which has subdivided storage means for compressed air in communication with said cylinder, and means to automatically maintain a predetermined air pressure in said storage means and in the cylinders under the pistons.

6. In a wheel of the character described, a substantially rigid rim portion, means to yieldingly support said rim portion by spokes which permit it to move only eccentrically about its hub center, said means comprising spokes connected to the rim, pistons hinged to the inner ends of the spokes to permit the latter to swing angularly in a circumferential plane of the wheel, cylinders for the plungers having means to confine the eccentric movements of the rim to the plane of the spokes by guides which limit the swing of the spokes about the pistons in said plane and brace them against lateral thrust, means to resist said angular play of the spokes, and a hollow subdivided hub open to the inner ends of the cylinders and adapted to be filled with bodies of air under pressure.

7. In a wheel of the character described, a hub subdivided and adapted to store compressed air, a plurality of radial cylinders mounted on the hub and communicating with the air storage at the hub and extending to a point adjacent to the rim of the wheel, means to brace the outer ends of the cylinders together, pistons for said cylinders exposed to the compressed air at the hub, rigid spokes hinged to the pistons and extending a short distance beyond the cylinders where they connect to the rim, a substantially rigid rim connected to said spokes so as to permit a slight eccentric displacement of the rim relatively to the hub, said spokes under said rim movements being free for a limited angular play in the circumferential plane of the wheel and in either direction, and guide means rigid with the hub and adapted to engage and brace the spokes against lateral thrust.

8. In a wheel of the character described, a hub comprising a divided reservoir for holding compressed air, a plurality of radial cylinders opening into said reservoir, pistons movable in the cylinders, a substantially rigid rim, and a series of rigid spokes which alone engage and support the rim and which are substantially radially disposed and hinged to the pistons and which have a slight yielding connection to the rim.

9. In a wheel of the character described, a hub comprising a divided reservoir for holding compressed air and a plurality of radial cylinders opening thereinto, pistons movable in the cylinders, a substantially rigid rim, a series of rigid spokes normally radially disposed and yieldingly connected to both pistons and rim, said spokes forming the sole support for the rim in all of its operating positions, means to brace the spokes against lateral thrust axially of the wheel, and instrumentalities to both resist and to limit the play of the spokes beyond a predetermined point in either direction in the circumferential plane of the wheel.

10. In a wheel of the character described, in combination, a hub having a divided air reservoir, a plurality of cylinders communicating with the hub and radially disposed, a rim, spokes connected to the rim and forming the sole support therefor in all of its operating positions, pistons hinged to the spokes and adapted to move in the cylinders, and means operable by the eccentric body movement of the rim relative to the hub center to pump air into said reservoir.

11. In a wheel of the character described, a hub having a divided reservoir for compressed air, cylinders and a series of pistons pressed outwardly by the reservoir pressure, rigid spokes positively connecting the pistons to a wheel rim and having a hinge connection to both rim and pistons to permit the rim to have a limited circumferential play in either direction, and pump means responsive to the relative eccentric displacement between the hub and rim to maintain the air pressure in the reservoir.

12. In a wheel of the character described, an outer rim, an inner polygonal brace rim connected to the outer rim so as to have a limited circumferential play relative thereto, said polygonal rim being continuous and having one or more corrugated portions left free to buckle, a hub, rim supporting means thereon, and yielding means carried by the hub and adapted to oppose the buckling of said corrugated portions.

13. In a wheel of the character described, an outer rim, an inner polygonal rim connected to the outer rim to brace it and having a limited circumferential play relative thereto, said polygonal rim being continuous and having one or more corrugated portions left free to buckle inwardly, and yielding means connected to the hub and to said corrugated portions and adapted to oppose the inward buckling of said corrugated portions, said means comprising a dashpot having a plunger connected to the inner rim and adapted to exert traction pull thereon.

14. In a wheel of the character described, a hub having a divided reservoir for compressed air, radial cylinders opening into the reservoir, piston plungers exposed to the reservoir pressure, means connected to the plungers and adapted to support the rim for a limited circumferential play in either direction while holding it against lateral thrust, brace means non-rigidly connected to said rim, and dashpots having plungers connected to said brace means and adapted to resist the displacement between the brace means and rim and to transmit traction pull from hub to rim, substantially as described.

15. In a pneumatic wheel, an outer rigid rim, radial rigid spokes connected to the rim, pistons loosely connected to the spokes, cylinders having slotted end caps to receive and guide the spokes which are free for a limited circumferential play only, and a hub having an air reservoir, said cylinders being radially mounted on the hub and open at their inner ends to the reservoir pressure.

16. In a pneumatic wheel, a rim having spokes and pistons on the inner ends of the spokes, a hub having cylinders which receive the pistons and having a divided compressed air reservoir communicating with the inner ends of the cylinders, a pump piston mounted in the inner end of a cylinder, a pump barrel movable with a piston and adapted to receive said pump piston, a valved outlet from the outer end of the barrel into the cylinder below said piston, and an air supply port opening into an intermediate point in the pump barrel.

17. In a pneumatic wheel, a rim having spokes and pistons on the inner ends of the spokes, a hub having cylinders which receive the pistons and having a divided compressed air reservoir communicating with the inner ends of the cylinders, a pump piston mounted in the inner end of several cylinders, a pump barrel movable with a piston and adapted to receive each said pump piston, a valved outlet from the outer end of the barrel into the cylinder below each piston, an air supply port opening into the inner end of each barrel, said port having an inwardly opening check valve, a loose packing for the outer ends of the cylinders, and means to hold the packing away from said pistons, substantially as described.

18. In a pneumatic wheel, a rim, a hub, spokes on the rim having pistons, cylinders on the hubs which receive the pistons, a hub reservoir divided to contain different bodies of compressed air to which the pistons are exposed, said cylinders having outer end caps which are provided with slots elongated circumferentially of the wheel and adapted to receive the spokes with a close sliding fit, a loose packing in the outer ends of the cylinders, screens to hold the packing from the pistons, said pistons having air inlet ports opening into a pump barrel therein, a pump plunger mounted on the hub and movable in said barrels, and an outwardly opening check valve controlling the discharge of compressed air from each pump barrel into the hub reservoir, and relief valves to prevent excessive pressures of said air bodies, substantially as described.

19. A pneumatic wheel comprising a hub having a divided air reservoir and a rim having a plurality of radial plunger supports, cylinders opening to the reservoir pressure and adapted to receive the plungers, means provided for a limited play of the spokes only in the circumferential plane of the wheel, and means to automatically maintain the reservoir pressure by the body movements of the rim, said means comprising pumps within a plurality of said cylinders and operated by the plungers, and relief valve means for the reservoir, substantially as described.

20. A buoyant wheel comprising a rim, spokes, pistons loosely connected to the inner ends of the spokes, cylinders for the pistons, a hub air reservoir into which the cylinders are fastened, spiders at the inner ends of the cylinders, and guides on the pistons slidably mounted in said spiders.

21. In a pneumatic wheel, a hub reservoir for compressed air which is divided into independent compartments adapted to contain oil, radially disposed cylinders leading from the marginal periphery of the hub and having each a free and unobstructed opening into one of said compartments, the opening being disposed to permit the oil under centrifugal force to freely enter said cylinders, a rim, and rim supporting pistons radially movable in said cylinders.

22. A wheel of the character described, comprising a rim, spokes connected to the rim and having a limited play in the circumferential plane of the rim, pistons loosely mounted on the ends of the spokes, radial cylinders to receive the pistons, a hub having means to maintain distinct bodies of compressed air to which the inner sides of the several pistons are exposed, pump means for cylinders in communication with each body of compressed air and operable by the piston movement to maintain the hub air pressure, and means to relieve excess air pressure at the hub, substantially as described.

23. In a wheel of the character described, a rim having spokes connected thereto which have a limited play in the circumferential plane of the rim, pistons of relatively large diameter as compared with the spokes which are loosely connected to the inner ends of the spokes and provided on their inner ends with guides, a hub having a subdivided air reservoir, and cylinders of large diameter at their outer ends and contracted diameter at their inner ends which are made fast to the hub and open into the sub-divisions of said reservoir, bearings for the piston guides in said cylinders, and mechanism responsive to the body movements of the rim relatively to the hub for maintaining a predetermined air pressure in the reservoir, substantially as described.

24. In a wheel of the character described, a substantially rigid rim, a hub having means for the storage of distinct bodies of compressed air, a plurality of radial cylinders connected to the hub, and communicating with said air storage means, pistons movable in the cylinders, rigid spokes loosely but positively connected to both rim and pistons, means to permit said spokes to swing with a limited angular play only in the circumferential plane of the rim, means utilizing the combination action of compressed air, and a yielding member to resist the angular play of said spokes.

25. In a pneumatic wheel, a hub having a divided storage reservoir for compressed air, cylinders on the hub and communicating with the reservoir, a rigid rim, means buoyantly supported on the compressed air of said reservoir in said cylinders and adapted to support said rim for bodily eccentric movement relative to the hub, and means responsive to said rim movements to automatically maintain a predetermined air pressure throughout said hub storage reservoir.

26. In a pneumatic wheel, a hub having radial cylinders mounted thereon, pistons movable in the cylinders, spokes hingedly connecting the rim and pistons, a divided air reservoir at the hub having each portion thereof communicating with several of said cylinders, means to maintain the air pressure in said reservoir by the relative movement between hub and rim, and means to transfer pressure by check valves from one to another division of the reservoir, and means to relieve excess reservoir pressures.

27. In a wheel of the character described, a substantially rigid rim, pistons, rigid spokes loosely but positively connected to both rim and pistons, and hub means to buoyantly support said pistons and force them radially outwardly therefrom by air pressure, side guides rigid with the hub for preventing said spokes from swinging angularly except in a circumferential plane of the rim, and means to prevent the turning of said pistons and spokes in their hub supporting means.

28. In a pneumatic wheel, a rim, a hub adapted to store separate bodies of oil and compressed air, spoke means connecting rim and hub and comprising cylinders exposed to the hub oil and air storage, pistons movable in the cylinders, and rigid spokes mounted on the pistons and free to have a limited play in the circumferential plane of the wheel, one or more of said pistons carrying an air pumping element of smaller cross sectional area than the piston, and pump means co-acting with said element to charge the hub storage.

29. In a pneumatic wheel, a substantially rigid rim, spokes having a positive connection to the rim but capable of a limited angular play in the plane of the rim, hub means for buoyantly supporting said spokes without interference with their said limited play, means for yieldably imparting the traction strains from hub to rim comprising short spokes buoyantly supported on the hub, and yieldable connections from the outer ends of said short spokes to the rim.

In testimony whereof I affix my signature.

WILLIAM HENRY McCAFFREY.

Witness:
NOMIE WELSH.